3,328,359
MODIFIED FIBER-FORMING POLYAMIDE
Otto Unger, Dormagen, Günther-Ernst Nischk, Leverkusen, Béla von Falkai, Dormagen, and Hugo Wilms, Leverkusen, Germany, assignors to Farbenfabriken Bayer Aktiengesellschaft, Leverkusen, Germany, a German corporation
No Drawing. Filed Feb. 7, 1964, Ser. No. 343,203
Claims priority, application Germany, Feb. 14, 1963, F 39,016
4 Claims. (Cl. 260—78)

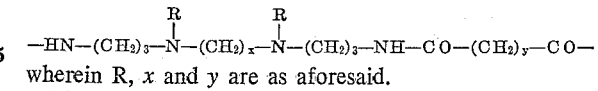

It is known that polyamides are produced by polymerizing lactams or by the polycondensation of diamines with dicarboxylic acids or their amide-forming derivatives.

In order to improve the dyeing capacity of polyamides with acidic dyestuffs, it has already been proposed to incorporate N,N-dialkyl alkylene diamines, for example N,N-dimethyl hexamethylene diamine, into the polyamide molecule. Tertiary amino groups, which facilitate dyeing with acidic dyestuffs, are then disposed at one end of the chain. It has also already been proposed to condense N,N'-aminoalkylene piperazines with dicarboxylic acids to form polyamides.

It has now been found that filaments or fibers with different degrees of elasticity and which can easily and uniformly be dyed with acidic dyestuffs can be produced from polyamides if the polyamide-forming starting materials, such as lactams or ammonium salts of diamines with dicarboxylic acids, are mixed with up to 25% of their total weight of ammonium salts of the general formula

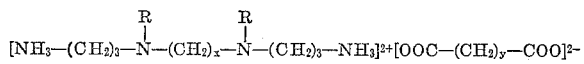

in which R represents alkyl or cycloalkyl radicals and $x$ and $y$ are integers from 2 to 12, the mixture is polycondensed and the linear polyamides which are obtained are shaped into filaments or fibers.

The basic polyamines used according to the invention are obtained, for example, by the action of acrylonitrile on N,N'-alkylated alkylene diamines. The initially-formed intermediates are then hydrogenated. N,N'-alkylated alkylene diamines that can be used include N,N'-dimethyl ethylene diamine, N,N'-dimethyl tetramethylene diamine, N,N'-dibutyl hexamethylene diamine and N,N'-dicyclohexyl hexamethylene diamine.

The tetramines thus produced are reacted with dicarboxylic acids to form the corresponding ammonium salts. They can best be produced in alcoholic solution. Examples of suitable dicarboxylic acids are succinic acid, glutaric acid, adipic acid, pimelic acid, suberic acid, azelaic acid, subacic acid and higher alkylene-dicarboxylic acids.

These ammonium salts are polycondensed with lactams or the ammonium salts of diamines and dicarboxylic acids, in processes conventional for the production of polyamides. Such lactams include, for example pyrrolidone, piperidone, and caprolactam, as well as their C-alkylation products. Diamines and dicarboxylic acids suitable for the polycondensation include, for example, ethylene diamine, tetramethylene diamine, pentamethylene diamine, hexamethylene diamine, octamethylene diamine and decamethylene diamine, as well as the previously mentioned alkylene-dicarboxylic acids.

The synthetic, liner fiber-forming polymers of increased affinity to acid dyestuffs, in accordance with the present invention, are selected from the group consisting of poly(hexamethylene adipamide) and poly(epsilon caproamide) containing, in the polymer chain, from about 0.1 to about 25% by weight, based on the total polymer, of a divalent radical of the formula:

$$-HN-(CH_2)_3-\underset{R}{N}-(CH_2)_x-\underset{R}{N}-(CH_2)_3-NH-CO-(CH_2)_y-CO-$$

wherein R, $x$ and $y$ are as aforesaid.

The polycondensation itself is carried out at temperatures above 180° C., advantageously from 220 to 260° C. Water is split off and polyamides of relatively high molecular weight are formed. Because of the presence of basic groups in the chain, these polyamides yield, after melt-spinning, filaments and fibers which can easily and uniformly be dyed with acidic dyestuffs. An additional advantage of the process according to the invention is that the elasticity of the filaments and fibers can be varied within certain limits by varying the long-chain substituents on the tertiary nitrogen atoms.

In order substantially to improve the capacity for dyeing with acidic dyestuffs and to achieve a uniform absorption, from about 0.1 to about 25% of the ammonium salts used according to the invention can also be incorporated into the polyamides.

EXAMPLE 1

(a) *N,N'-dimethyl-N,N'-di - γ - aminopropyl ethylene diamine.*—110 parts of acrylonitrile are gradually added to 88 parts of N,N'-dimethyl ethylene diamine at room temperature while stirring. An exothermic reaction takes place. On reaching 60 to 80° C., the temperature is kept constant by cooling. After addition of the acrylonitrile is complete, stirring is continued for one hour at 80° C. and any excess acrylonitrile is evaporated in vacuo. Yield: 190 parts.

300 parts of this adduct are hydrogenated by addition of 300 parts of terahydrofurane, 100 parts of liquid ammonia and 45 parts of Raney cobalt at 80 to 100° C. and a hydrogen pressure of 120 to 150 atm. After cooling, the substance is filtered off from the Raney cobalt and concentrated by evaporation in vacuo. B.P. 0.01 mm.: 93° C.; yield: 290 parts.

(b) 195 parts of this tetramine are dissolved in 195 parts of alcohol and a solution of 146 parts of adipic acid in 500 parts by volume of alcohol is added. A clear solution is formed and ether is added to this. At first a viscous oil is precipitated but this crystallizes soon. Yield: 330 parts of the diammonium salt.

(c) *Condensation of the adipate from 1(b) with caprolactam.*—5 parts of the adipate are heated at 240° C. to 250° C. with 85 parts of caprolactam and 10 parts of ε-aminocaproic acid with stirring and in an atmosphere of pure nitrogen. Polymerization and condensation begin at 200° C. The reaction is allowed to continue for 14 to 16 hours at 240 to 250° C. A highly viscous melt is formed, the relative viscosity of which is 2.55.

After comminution, the polyamide is spun from the melt at 235° C. The filaments and fibers which are formed can easily and uniformly be dyed with acidic dyestuffs.

EXAMPLE 2

10 parts of the adipate of Example 1(b) are heated at 240° C. with 10 parts of ε-aminocaproic acid and 80 parts of caprolactam while stirring, in an atmosphere of nitrogen, until the mixture has a relative viscosity of 2.5. The melt is forced out of the autoclave as a filament and it is immediately comminuted. The polyamide is then spun from the melt at 230° C. to form filaments which can uniformly be dyed by acidic dyestuffs.

EXAMPLE 3

10 parts of the adipate of Example 1(b) are heated to 270° C. with 90 parts of the adipic acid salt of hexamethylene diamine in an atmosphere of nitrogen while stirring. After one hour the pressure is progressively reduced to 1 mm. When the relative viscosity has reached 2.7, the condensation is stopped. The polyamide melt is forced as a filament out of the autoclave and is comminuted. The chips are spun at a melt temperature of 270° C. to form filaments, which can be dyed uniformly with acidic dyestuffs.

EXAMPLE 4

(a) *N,N'-diisobutyl-N,N'-di-γ-cyanoethyl hexamethylene diamine.*—120 parts of acrylonitrile are gradually added while stirring to 288 parts of N,N'-diisobutyl hexamethylene diamine. The temperature is held at 60 to 80° C. by cooling the reaction vessel as necessary. Heating is continued for one hour at 80° C. and excess acrylonitrile is then evaporated in vacuo. Yield: 330 g.

(b) 300 parts of tetrahydrofurane, 100 parts by volume of liquid ammonia and 50 parts of Raney cobalt are added to 330 parts of the adduct which are hydrogenated at 80 to 100° C. under a hydrogen pressure of 100 to 150 atm. After removing the Raney cobalt, the substance is concentrated by evaporation in vacuo. 320 parts of N,N'-diisobutyl-di-γ-aminopropyl hexamethylene diamine are obtained.

| Experiment | | Viscosity of the extracted chips | Extensibility, percent | Tensile strength, g./den. | Melting points, °C. | Monofilament, g./den. | Multifilament, g./den. |
|---|---|---|---|---|---|---|---|
| V1 | 96.25 kg. of caprolactam<br>2.50 kg. of ε-aminocaproic acid<br>1.25 kg. of tetramine adipate ¹<br>0.12 kg. of acetic acid | η=2.70<br>3140P | 38.5–47.6 | 3.84–4.33 | 218–219 | | 60/12 |
| V2 | 95.00 kg. of caprolactam<br>2.50 kg. of ε-aminocaproic acid<br>2.50 kg. of tetramine adipate ¹<br>0.12 kg. of acetic acid | η=2.67 | 31.0–39.0 | 3.30–3.90 | 223 | 70–75 | |
| V3 | 43.75 kg. of caprolactam<br>3.75 kg. of ε-aminocaproic acid<br>2.50 kg. of tetramine adipate ¹ | η=3.04<br>7770P | 27.9–34.0 | 5.20–5.50 | 216–218 | | 78/1 |

¹ =N,N'-dimethyl-N,N'-di-γ-aminopropyl-ethylene diamine adipate.

(c) 332 parts of the tetraamine obtained in Example (4)b are dissolved in 500 parts by volume of ether and a solution of 146 parts of adipic acid in 500 parts by volume of alcohol is added. After thorough mixing, another 700 parts by volume of ether are introduced. The adipate at first forms in a somewhat slimy state but soon completely crystallizes.

(d) 10 parts of the adipate described in Example 4(c) are heated to 240° C. with 85 parts of ε-caprolactam and 5 parts of ε-aminocaproic acid in an atmosphere of nitrogen. A greater increase in viscosity begins at 210° C. After heating for 14 hours at 240° C., the polyamide has a relative viscosity of 2.5. It is drawn as a filament from the autoclave into water and then is comminuted. It is spun from the melt at 230° C. giving filaments which can uniformly be dyed with acidic dyestuffs.

EXAMPLE 5

85 parts of caprolactam, 10 parts of ε-aminocaproic acid, 5 parts of N,N'-dimethyl-N,N'-di-γ-aminopropyl ethylenediamine adipate and some acetic acid to break off the chain are inserted into an autoclave and condensed at 250° C. under nitrogen for 3 to 4 hours. The melt obtained is then spun out of the autoclave in the form of an endless thick filament. This filament is cut to chips, the chips extracted with water and subsequently dried to a water content of 0.09 to 0.1%. The addition of acetic acid serves to limit the viscosity of the melt.

The chips are spun into yarns, and these modified polyamide yarns shown good affinity for dyestuffs of the series of Telonlight-, Telonfast-, Supramin-, Supranol-, and Sirius-dyestuffs.

A comparison of the affinity of normal polyamide yarns from caprolactam and modified polyamide yarns containing 5% of the above tetramine adipate shows the following results. In the experiments the dyeing was carried out either in a single bath or in separate baths.

Siriuslightblue BRR, 1%, goods to liquor ratio 1:100, pH 5.0, 1.5 hours, in one bath
18.8 mg. dyestuff/g. of yarn (modified polyamide yarns)
1.9 mg. dyestuff/g. of yarn (normal polyamide yarns)

Dyeing in separate baths:

Siriuslightblue BRR, goods to liquor ratio 1:100, pH 5.0, 1.5 hours
12.0 mg. dyestuff/g. of yarn (modified polyamide yarns)
1.6 mg. dyestuff/g. of yarn (normal polyamide yarns)

Dyeing in separate baths:

Siriuslightblue BRR, 8%, goods to liquor ratio 1:100, pH 5.0, 1.5 hours
78.6 mg. dyestuff/g. of yarn (modified polyamide yarns)
19.7 mg. dyestuff/g. of yarn (normal polyamide yarns)

In the table the physical constants of the polyamide yarns obtained by Experiments V1 to V3 are compiled.

We claim.

1. A synthetic linear fiber-forming polymer of increased affinity to acid dyestuffs selected from the group consisting of poly(hexamethylene adipamide) and poly(epsilon caproamide) containing in the polymer chain from about 0.1 to about 25% by weight, based on the total polymer, of a divalent radical of the formula:

$$-NH-(CH_2)_3-\underset{R}{N}-(CH_2)_x-\underset{R}{N}-(CH_2)_3-NH-CO-(CH_2)_y-CO-$$

wherein R is lower alkyl of 1 to 4 carbon atoms and $x$ and $y$ are integers from 2 to 12.

2. The polymer of claim 1 wherein said selected member is poly(epsilon caproamide), R is methyl, $x$ is 2 and $y$ is 4.

3. The polymer of claim 1 wherein said selected member is poly(hexamethylene adipamide), R is methyl, $x$ is 2 and $y$ is 4.

4. The polymer of claim 1 wherein said selected member is poly(epsilon caproamide), R is isobutyl, $x$ is 6 and $y$ is 4.

References Cited

UNITED STATES PATENTS

| 2,359,833 | 10/1944 | Faris | 260—78 |
| 2,671,071 | 3/1954 | Laakso et al. | 260—78 |
| 2,904,536 | 9/1959 | Reith | 260—78 |
| 3,259,606 | 7/1966 | Okada | 260—78 |

WILLIAM H. SHORT, *Primary Examiner.*

H. D. ANDERSON, *Assistant Examiner.*